(12) United States Patent
Kito et al.

(10) Patent No.: US 11,754,166 B2
(45) Date of Patent: Sep. 12, 2023

(54) POWER TRANSMISSION DEVICE AND ENGAGEMENT ADJUSTING DEVICE FOR GEAR MECHANISM

(71) Applicant: Nabtesco Corporation, Tokyo (JP)

(72) Inventors: Tetsuya Kito, Tokyo (JP); Masato Uchihara, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 17/729,160

(22) Filed: Apr. 26, 2022

(65) Prior Publication Data

US 2022/0349463 A1  Nov. 3, 2022

(30) Foreign Application Priority Data

Apr. 28, 2021   (JP) ................................ 2021-076635

(51) Int. Cl.
  *F16H 57/022*   (2012.01)
  *F16H 1/06*   (2006.01)

(52) U.S. Cl.
  CPC ............. *F16H 57/022* (2013.01); *F16H 1/06* (2013.01); *F16H 2057/0222* (2013.01)

(58) Field of Classification Search
  CPC .. F16H 1/06; F16H 57/022; F16H 2057/0222; F16H 2057/0225; F16H 2057/02073; F16H 57/023; B25J 9/102
  See application file for complete search history.

(56) References Cited

U.S. PATENT DOCUMENTS

| 1,333,490 | A | * | 3/1920 | Hines | ........................ F16H 1/06 |
| | | | | | 74/397 |
| 2,590,675 | A | * | 3/1952 | Bottorff | ................ F16H 57/025 |
| | | | | | 74/397 |
| 4,621,962 | A | | 11/1986 | Rozniecki | |
| 9,726,272 | B2 | * | 8/2017 | Bell | ..................... F04C 15/0061 |
| 10,077,067 | B2 | * | 9/2018 | Uchihara | ................. B62D 3/04 |
| 2005/0009662 | A1 | * | 1/2005 | Sudou | ..................... F16H 48/08 |
| | | | | | 74/606 R |

(Continued)

FOREIGN PATENT DOCUMENTS

| EP | 1707844 A1 | 10/2006 |
| JP | 2005256930 A | * 9/2005 |

(Continued)

OTHER PUBLICATIONS

Extended European Search Report dated Sep. 12, 2022, issued in corresponding European Patent Application No. 22169717.0 (10 pgs.).

*Primary Examiner* — Bobby Rushing, Jr.
(74) *Attorney, Agent, or Firm* — Pillsbury Winthrop Shaw Pittman, LLP

(57) ABSTRACT

A power transmission device according to one aspect of the disclosure includes a first gear, a base member, a second gear, a support block, a position adjusting unit, and a fixing unit. The base member rotatably supports the first gear. The second gear engages with the first gear so as to be able to transmit power. The support block rotatably supports the second gear. The position adjusting unit adjusts relative positions of the support block and the base member in a direction in which an engagement depth between the second gear and the first gear varies. The fixing unit fixes the relative positions of the support block and the base member.

3 Claims, 4 Drawing Sheets

(56) References Cited

U.S. PATENT DOCUMENTS

| | | | |
|---|---|---|---|
| 2014/0083221 A1* | 3/2014 | Hein | F16H 55/12 |
| | | | 74/421 A |
| 2017/0016514 A1 | 1/2017 | Jones | |
| 2020/0102002 A1* | 4/2020 | Kirschstein | F16H 57/021 |
| 2020/0230809 A1* | 7/2020 | Murakami | F16H 57/039 |
| 2021/0003202 A1* | 1/2021 | Eitelbuss | F16H 57/12 |

FOREIGN PATENT DOCUMENTS

| | | | |
|---|---|---|---|
| JP | 2008298212 A * | 12/2008 | |
| JP | 2012-112455 A | 6/2012 | |
| JP | 2014079792 A * | 5/2014 | B21H 5/02 |
| JP | 2019-158143 A | 9/2019 | |
| WO | 93/00530 A1 | 1/1993 | |

\* cited by examiner

POWER TRANSMISSION DEVICE AND ENGAGEMENT ADJUSTING DEVICE FOR GEAR MECHANISM

CROSS-REFERENCE TO RELATED APPLICATIONS

The present application is based on and claims the benefit of priority from Japanese Patent Application Serial No. 2021-076635 (filed on Apr. 28, 2021), the contents of which are hereby incorporated by reference in their entirety.

TECHNICAL FIELD

The present disclosure relates to a power transmission device for transmitting rotational power to an object of operation, and also relates to an engagement adjusting device for a gear mechanism.

BACKGROUND

In many mechanical devices such as turntables and industrial robots, the power of a drive source is transmitted to an object of operation via a power transmission device including a gear mechanism (see, for example, Japanese Patent Application Publication No. 2019-158143).

In mechanical devices required to have a high operation accuracy, engagement accuracy is important for the gear mechanism used in the power transmission device. Therefore, in the manufacturing process of the power transmission device used in such mechanical devices, gears in the gear mechanism are assembled to a gear support with a high accuracy using positioning pins or the like.

In the power transmission device, the engagement between gears may vary due to the service environment after shipping and wear of parts resulting from long-time service.

In the manufacturing process of conventional power transmission devices, gears are assembled to a gear support with a high accuracy. However, no measures are taken against the variation of the engagement between the gears after shipping. Therefore, if the engagement between gears has varied largely after shipping, it is necessary to disassemble the power transmission device for replacement of parts or reassembling.

SUMMARY

The present disclosure provides a power transmission device and an engagement adjusting device for a gear mechanism, capable of readily adjusting the engagement between gears to an optimal state as necessary.

(1) A power transmission device according to one aspect of the present disclosure comprises: a first gear; a base member rotatably supporting the first gear; a second gear engaging with the first gear so as to be able to transmit power; a support block rotatably supporting the second gear; a position adjusting unit for adjusting relative positions of the support block and the base member in a direction in which an engagement depth between the second gear and the first gear varies; and a fixing unit for fixing the relative positions of the support block and the base member.

(2) In the power transmission device of (1), it is also possible that the position adjusting unit is constituted by a screw mechanism including an adjustment screw having a screw shaft extending in the direction in which the engagement depth between the second gear and the first gear varies. It is also possible that the screw mechanism is rotatably retained on one of the support block and the base member at one end side in the axial direction of the screw shaft, and the screw mechanism is screwed into the other of the support block and the base member at the other end side in the axial direction.

(3) In the power transmission device of (2), it is also possible that the support block includes: a housing case of a speed reducer, the speed reducer being configured to transmit decelerated power to the second gear; and an adapter block fitted on an outer peripheral surface of the housing case. In the screw mechanism, it is also possible that the screw mechanism is rotatably retained on the base member at the one end side, and the screw mechanism is screwed into the adapter block at the other end side.

(4) In the power transmission device of (1), it is also possible that the fixing unit includes: a fastening member configured to be fastened in an intersection direction intersecting with the direction in which the engagement depth between the second gear and the first gear varies, the fastening member being configured to fix the support block to the base member; and a shaft hole provided in the support block along the intersection direction and penetrated by a shaft of the fastening member. It is also possible that the shaft hole has such an inner shape or a size as to allow displacement of the support block in the direction in which the engagement depth between the second gear and the first gear varies.

(5) In the power transmission device of (4), it is also possible that the shaft of the fastening member has such an outer diameter as to form a gap between the shaft and the shaft hole, and the gap is formed to allow the displacement.

(6) An engagement adjusting device for a gear mechanism according to one aspect of the present disclosure comprises: a base member rotatably supporting a first gear; a support block rotatably supporting a second gear, the second gear engaging with the first gear so as to be able to transmit power; a position adjusting unit for adjusting relative positions of the support block and the base member in a direction in which an engagement depth between the second gear and the first gear varies; and a fixing unit for fixing the relative positions of the support block and the base member.

Each of the power transmission device and the engagement adjusting device for a gear mechanism described above includes: the position adjusting unit for adjusting the relative positions of the support block supporting the second gear and the base member supporting the first gear; and the fixing unit for fixing the relative positions of the support block and the base member. Therefore, the position adjusting unit can adjust the relative positions of the support block and the base member such that the gears engage with each other in the optimal manner, and in this state, the fixing unit can fix the relative positions of the support block and the base member. Accordingly, with the above configuration, it is possible to readily adjust the engagement between the second gear and the first gear in the optimal manner when necessary.

DESCRIPTION OF THE EMBODIMENTS

The embodiments of the present disclosure will be hereinafter described with reference to the drawings.

Figure 1:
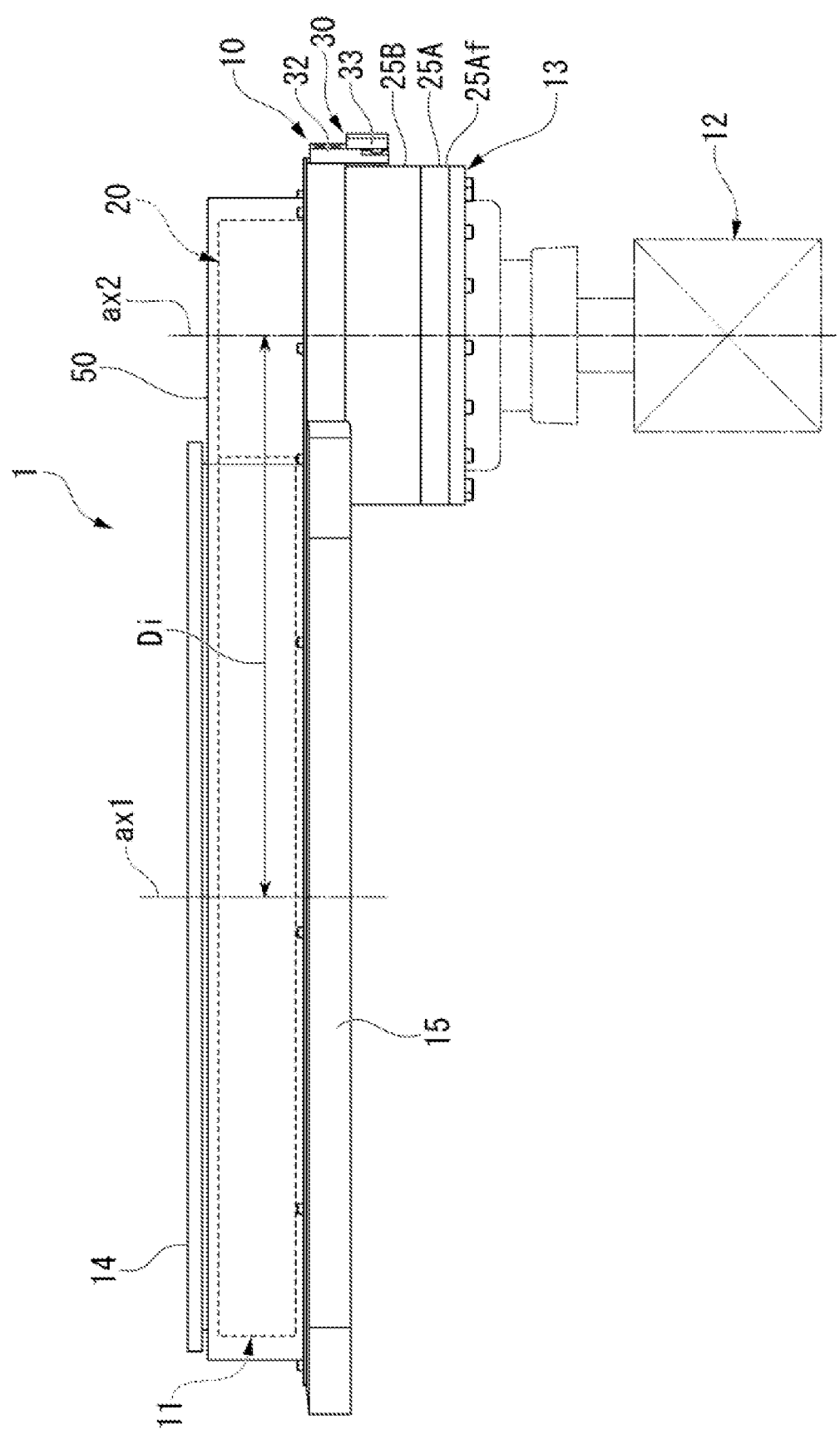
FIG. 1 is a side view of a rotating jig including a power transmission device according to an embodiment.
Figure 2:
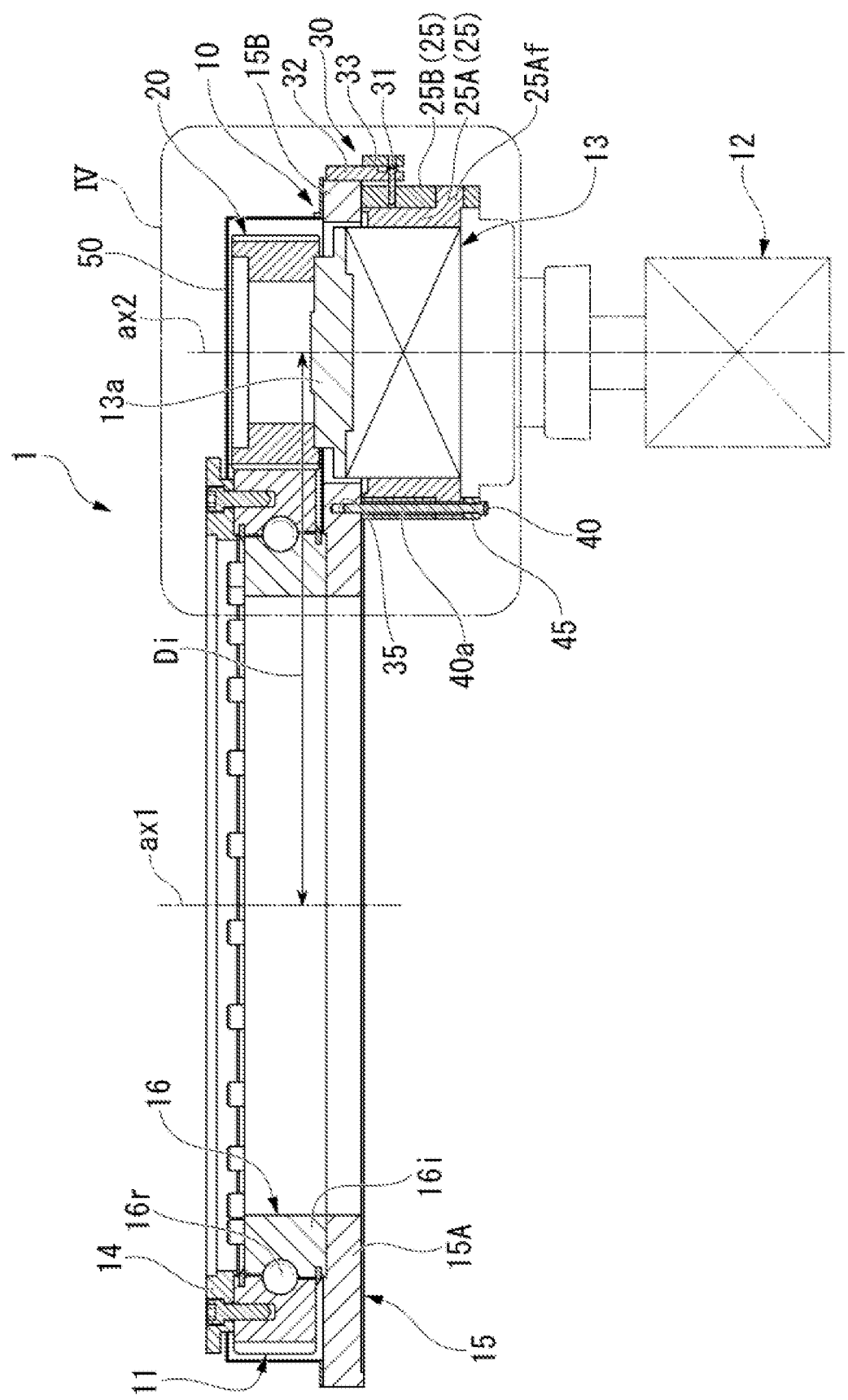
FIG. 2 is a longitudinal sectional view of the rotating jig according to the embodiment.

FIG. 1 is a side view of a rotating jig 1 including a power transmission device 10 according to an embodiment. FIG. 2 is a longitudinal sectional view of the rotating jig 1. The rotating jig 1 is used for, for example, welding of instruments. The rotating jig 1 includes a ring gear 11 (first gear) serving as a rotation output unit, a motor 12 serving as a drive source, and a speed reducer 13 for decelerating the rotation of the motor 12 and transmitting the decelerated rotation to the ring gear 11. An output unit 13a of the speed reducer 13 has a pinion gear 20 mounted thereto. The teeth 20a (see FIG. 3) of the pinion gear 20 engage with the external teeth 11a (see FIG. 3) of the ring gear 11 to transmit the rotation of the pinion gear 20 to the ring gear 11. In the embodiment, the power transmitting path portion from the speed reducer 13 to the ring gear 11 in the rotating jig 1 constitutes the power transmission device 10.

An adapter ring 14 is fixed to one end surface of the ring gear 11 in the axial direction. The adapter ring 14 has mounted thereto an instrument fixing plate or the like (not shown) that supports an object to be rotated (for example, an object to be welded).

The ring gear 11 is rotatably supported on a base member 15 via a bearing 16. The base member 15 includes a first annular portion 15A having a large diameter and a second annular portion 15B having a small diameter. On one axial end surface of the first annular portion 15A, there is fixed an inner race 16i of the bearing 16. On the second annular portion 15B, the speed reducer 13 is fixed. In the embodiment, the second annular portion 15B is integrally formed on the outer periphery of the first annular portion 15A. Both the first annular portion 15A and the second annular portion 15B have a short-axis cylindrical shape. The first annular portion 15A and the second annular portion 15B may be formed of separate parts and fixed to each other by a fixing means such as a bolt.

The sign ax1 in FIGS. 1 and 2 denotes the central axis of the first annular portion 15A. The sign ax2 denotes the central axis of the second annular portion 15B. The inner race 16i of the bearing 16 and the ring gear 11, which is supported on the outer peripheral side of the inner race 16i via rolling elements 16r (for example, balls), are coaxial with each other and centered at the central axis ax1. The ring gear 11 is rotatable around the central axis ax1. The first annular portion 15A of the base member 15 is mounted to a support device (not shown) supporting the rotating jig 1. The ring gear 11 and the pinion gear 20 are externally covered by a transmission cover 50 formed of a metal plate. The transmission cover 50 is fixed to the base member 15.

Figure 3:
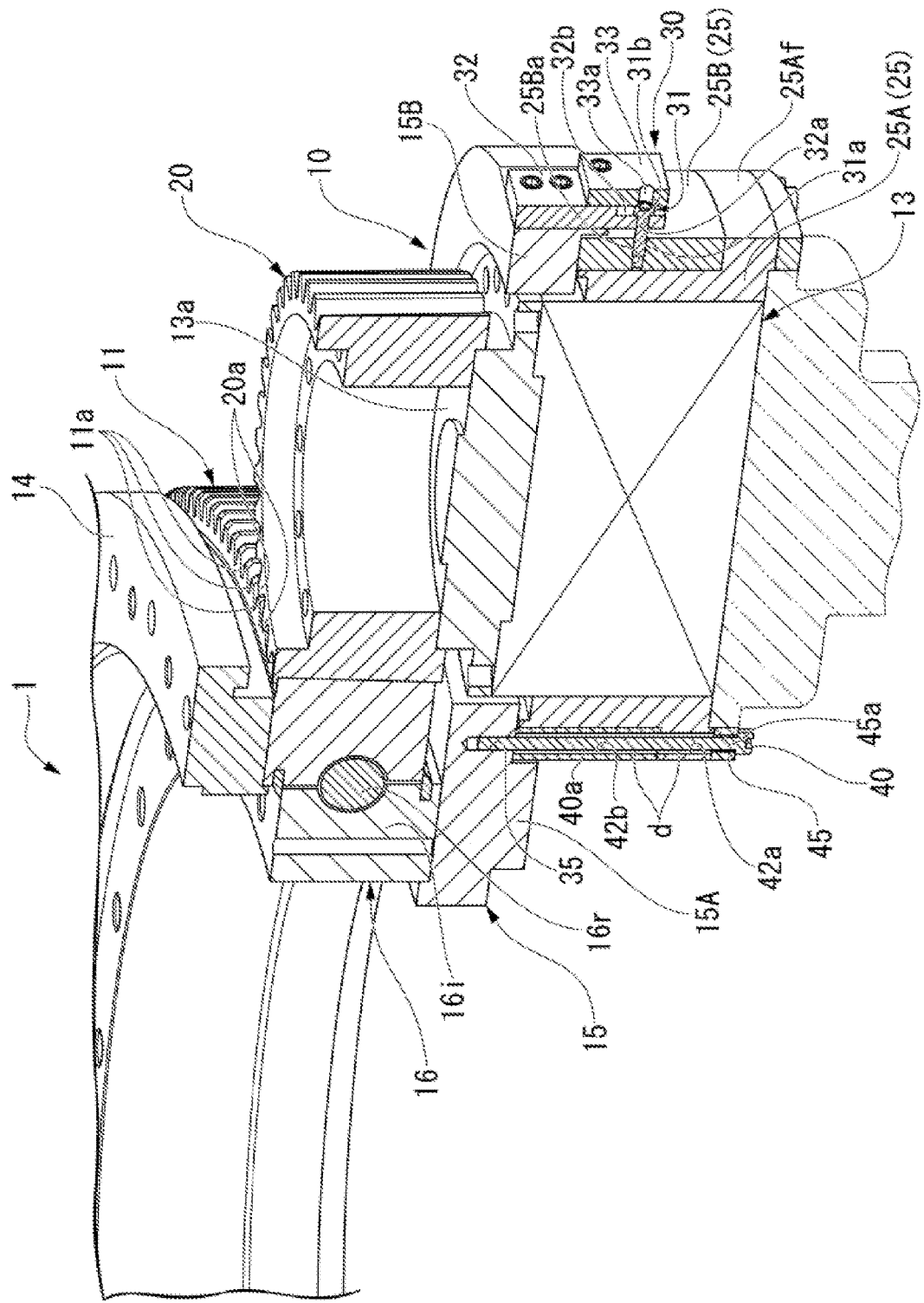
FIG. 3 is a partial sectional perspective view of the rotating jig according to the embodiment.
Figure 4:
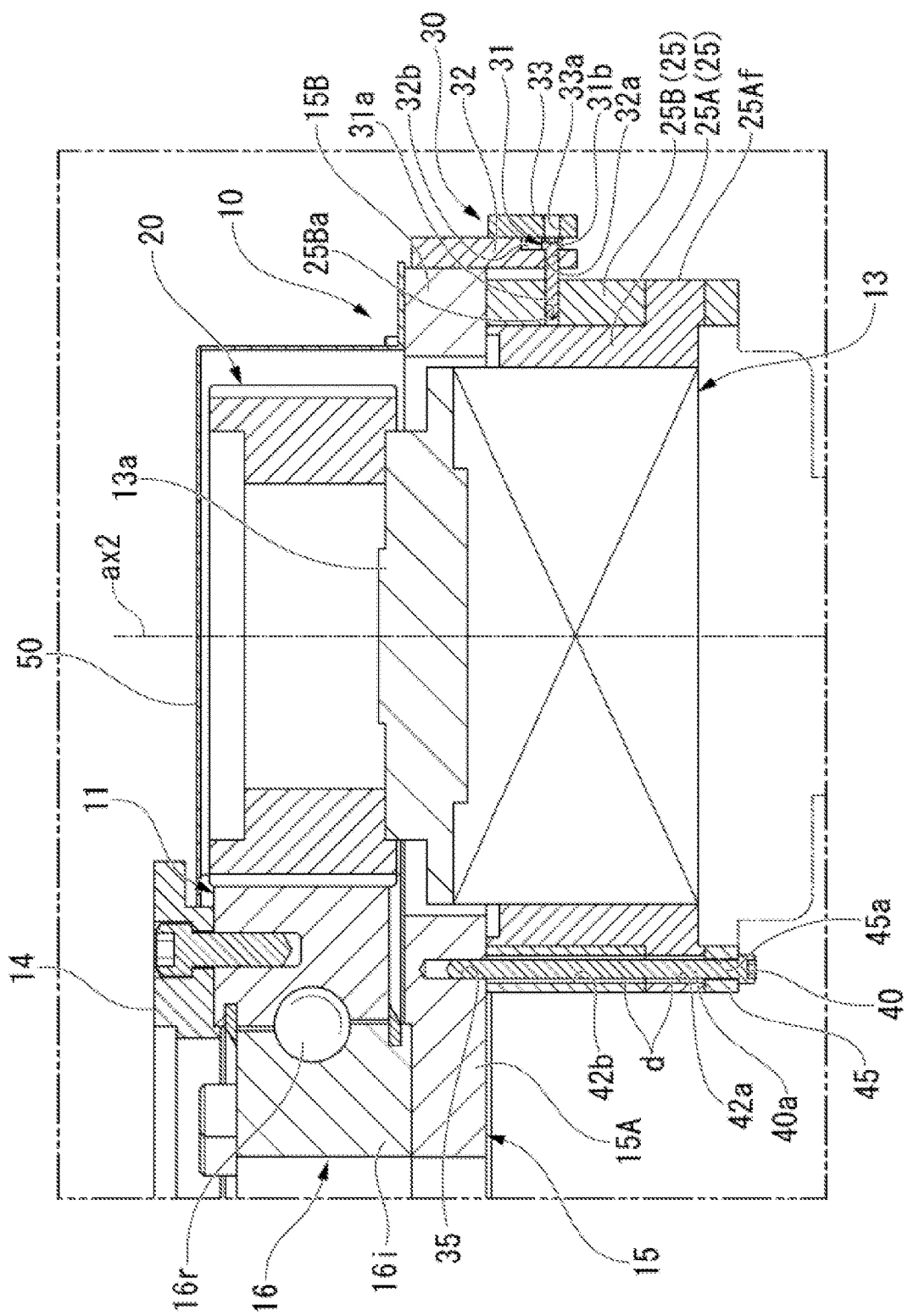
FIG. 4 is an enlarged sectional view of the part IV of FIG. 2.

FIG. 3 is a partial sectional perspective view of the rotating jig 1 cut at the same portion as in FIG. 2. FIG. 3 does not show the transmission cover 50 externally covering the ring gear 11 and the pinion gear 20. FIG. 4 is an enlarged sectional view of the part IV of FIG. 2. The speed reducer 13 includes a housing case 25A having a substantially cylindrical shape. The housing case 25A houses a reduction mechanism. The output unit 13a is provided at one end of the speed reducer 13 in the axial direction. The output unit 13a has the pinion gear 20 mounted thereto. On the other end of the speed reducer 13 in the axial direction, there is mounted a motor 12 serving as a drive source. On the outer periphery of the end portion of the housing case 25A on the motor 12 side, there is integrally formed a fixing flange 25Af having an annular shape and projecting radially outward. The fixing flange 25Af has a plurality of shaft holes 42a extending therethrough in the axial direction. The shaft holes 42a formed in the fixing flange 25Af are arranged at regular intervals in the circumferential direction. Each of the shaft holes 42a is penetrated by a fastening bolt 40 (fastening member) for fixing the speed reducer 13 to the second annular portion 15B of the base member 15.

An adapter block 25B having a cylindrical shape is fitted on the portion of the housing case 25A of the speed reducer 13 that is adjacent to the output unit 13a side of the fixing flange 25Af. The adapter block 25B has substantially the same outer diameter as the fixing flange 25Af of the housing case 25A. In other words, the radial thickness of the adapter block 25B is substantially the same as the radial projection width of the fixing flange 25Af. The adapter block 25B has a plurality of shaft holes 42b extending therethrough in the axial direction. The shaft holes 42b formed in the adapter block 25B are arranged at regular intervals in the circumferential direction, so as to form one-to-one correspondence to the shaft holes 42a in the fixing flange 25Af. Each of the shaft holes 42b is penetrated by the fastening bolt 40 for fixing the speed reducer 13 to the second annular portion 15B of the base member 15.

The speed reducer 13 is fixed to the second annular portion 15B with a plurality of fastening bolts 40 along with the adapter block 25B fitted on the housing case 25A. The second annular portion 15B has screw holes 35 formed therein for threadably receiving the distal end portions of the shafts 40a of the plurality of fastening bolts 40. The screw holes 35 formed in the second annular portion 15B are arranged at regular intervals in the circumferential direction.

The outer diameter of the shaft 40a of each fastening bolt 40 is smaller than the inner diameter of the shaft hole 42a of the housing case 25A (fixing flange 25Af) and the inner diameter of the shaft hole 42b of the adapter block 25B. Specifically, the outer diameter of the shaft 40a of each fastening bolt 40 is set such that a gap d is formed between the shaft 40a and the shaft holes 42a, 42b and the gap d allows radial displacement of the housing case 25A and the adapter block 25B. Accordingly, the radial positions of the housing case 25A and the adapter block 25B can be adjusted when they are temporarily fastened with the fastening bolts 40 to the second annular portion 15B (not fastened completely). Actually, the displacement of the housing case 25A and the adapter block 25B for the position adjustment is restricted by a position adjusting unit 30 (described later) to the direction of the line connecting between the central axis ax2 of the pinion gear 20 and the central axis ax1 of the ring gear 11 (hereinafter referred to as "the gear-to-gear direction Di").

In fixing the housing case 25A and the adapter block 25B to the second annular portion 15B with the fastening bolts 40, a washer 45 having an annular shape is placed on the end surface of the fixing flange 25Af (the end surface opposite to the adapter block 25B). The washer 45 has a plurality of insertion holes 45a formed therein through which the shafts 40a of the fastening bolts 40 are inserted. The heads of the fastening bolts 40 contact with the peripheries of the insertion holes 45a. The inner diameter of the insertion holes 45a is smaller than the inner diameters of the shaft holes 42a, 42b of the housing case 25A and the adapter block 25B. Therefore, even when the fastening bolts 40 are to the standard with a smaller diameter than the shaft holes 42a, 42b of the housing case 25A and the adapter block 25B, the fastening load acting on the heads of the fastening bolts 40 can be securely received by the washer 45 and transmitted to the housing case 25A and the adapter block 25B. In the embodiment, the housing case 25A and the adapter block 25B constitute a support block 25 that rotatably supports the pinion gear 20 (second gear).

On the outer peripheral surface of the second annular portion 15B of the base member 15, there is mounted a retaining block 32 shaped like a rectangular plate. A part of the retaining block 32 projects from the second annular portion 15B on the other end side in the axial direction of the second annular portion 15B. The retaining block 32 is fixed to a planed portion of the outer peripheral surface of the second annular portion 15B by bolt fastening, for example.

The portion of the retaining block 32 projecting from the second annular portion 15B (hereinafter referred to as "the projecting portion") has a surface facing outward in the radial direction of the second annular portion 15B, and this surface is cut out into a stepped shape. This portion cut out is hereinafter referred to as "the cut-out portion 32b." The projecting portion (the portion facing the cut-out portion 32b) has an insertion hole 32a formed therein through which a screw shaft 31a of an adjustment screw 31 is inserted.

The insertion hole 32a extends along the gear-to-gear direction Di. In the insertion hole 32a, the screw shaft 31a of the adjustment screw 31 is rotatably supported on the retaining block 32 at one end side in the axial direction of the screw shaft 31a. Accordingly, the screw shaft 31a of the adjustment screw 31 rotatably supported in the insertion hole 32a extends along the gear-to-gear direction Di.

On the outer side surface of the retaining block 32 (the surface opposite to the side contacting with the outer peripheral surface of the second annular portion 15B), there is mounted a displacement restraining block 33 shaped like a rectangular plate smaller than the retaining block 32. The displacement restraining block 33 is fixed to the outer side surface of the retaining block 32 by bolt fastening, for example.

The displacement restraining block 33 extends to the position facing the cut-out portion 32b of the retaining block 32 and faces the outer side surface of the projecting portion of the retaining block 32 across the cut-out portion 32b. In the gap formed by the cut-out portion 32b between the retaining block 32 and the displacement restraining block 33, there is located the head 31b of the adjustment screw 31 retained in the insertion hole 32a. In the gap formed by the cut-out portion 32b, the head 31b contacts with the retaining block 32 and the displacement restraining block 33. In this way, the adjustment screw 31 is restrained from being displaced in the axial direction thereof.

At the position in the displacement restraining block 33 facing the insertion hole 32a of the retaining block 32, there is formed a tool insertion hole 33a that is coaxial with the insertion hole 32a. A tool such as a hexagon wrench can be inserted through the tool insertion hole 33a. To rotate the adjustment screw 31, a tool such as a hexagon wrench is inserted into the tool insertion hole 33a, and the distal end portion of the tool is fitted into the hexagonal hole in the head 31b of the adjustment screw 31. The tool is then rotated to rotate the adjustment screw 31.

At the position in the outer peripheral wall of the adapter block 25B facing the insertion hole 32a of the retaining block 32, there is formed a screw hole 25Ba. The screw hole 25Ba extends along the gear-to-gear direction Di. The adjustment screw 31 is screwed into the adapter block 25B at the other axial end side of the screw shaft 31a. Thus, the portion of the screw shaft 31a on the head 31b side is retained by the retaining block 32, and the portion of the screw shaft 31a on the distal end side is supported by the adapter block 25B. When the adjustment screw 31 is rotated, the adapter block 25B, which is temporarily fastened with the fastening bolts 40 to the second annular portion 15B along with the housing case 25A (speed reducer 13), advances or retracts along the gear-to-gear direction Di in accordance with the direction and the amount of rotation of the adjustment screw 31.

Specifically, when the adjustment screw 31 is rotated in one direction, the pinion gear 20 moves closer to the ring gear 11 in accordance with the amount of rotation, resulting in a larger engagement depth between these gears. When the adjustment screw 31 is rotated in the other direction, the pinion gear 20 moves away from the ring gear 11 in accordance with the amount of rotation, resulting in a smaller engagement depth between these gears.

In the embodiment, the screw mechanism including the adjustment screw 31, the retaining block 32, the displacement restraining block 33, and the screw hole 25Ba of the adapter block 25B constitutes a position adjusting unit 30 for adjusting the relative positions of the support block 25 and the base member 15 along the gear-to-gear direction Di.

The power transmission device 10 used in the rotating jig 1 of the embodiment is configured such that the engagement depth between the pinion gear 20 and the ring gear 11 can be adjusted after shipping in the following matter.

First, the plurality of fastening bolts 40 are loosened with a tool, resulting in the temporarily fastened state of the support block 25 (the housing case 25A and the adapter block 25B). In this state, the support block 25 can be displaced along the gear-to-gear direction Di.

Next, in this state, a tool is inserted into the tool insertion hole 33a of the displacement restraining block 33. The too is then used to rotate the adjustment screw 31 of the position adjusting unit 30. Thus, the speed reducer 13 is displaced along the gear-to-gear direction Di such that the pinion gear 20 and the ring gear 11 engage with each other in the optimal manner.

In this way, the engagement between the pinion gear 20 and the ring gear 11 is adjusted to the optimal state. The plurality of fastening bolts 40 are then fastened with the tool, so as to secure the support block 25 (the housing case 25A and the adapter block 25B) to the second annular portion 15B of the base member 15.

Advantageous Effects of the Embodiment

The power transmission device 10 of the embodiment includes: the position adjusting unit 30 for adjusting the relative positions of the support block 25 supporting the pinion gear 20 and the base member 15 supporting the ring gear 11; and a fixing unit (the fastening bolts 40, the shaft holes 42a, 42b, and the screw holes 35) for fixing the relative positions of the support block 25 and the base member 15. Therefore, the position adjusting unit 30 can adjust the relative positions of the support block 25 and the base member 15 such that the pinion gear 20 and the ring gear 11 engage with each other in the optimal manner. In this state, the fixing unit can fix the relative positions of the support block 25 and the base member 15. Accordingly, the power transmission device 10 of the embodiment makes it possible to readily adjust the engagement between the pinion gear 20 and the ring gear 11 in the optimal manner when necessary.

Further, in the power transmission device 10 of the embodiment, the position adjusting unit 30 for adjusting the position of the support block 25 relative to the base member 15 includes the adjustment screw 31 (screw shaft 31a) extending along the gear-to-gear direction Di. The adjustment screw 31 is positioned such that one axial end side of the screw shaft 31a is rotatably retained on a member on the base member 15 side and the other axial end side of the screw shaft 31a is screwed into the support block 25 (adapter block 25B). Note that the member on the base member 15 side refers to the base member 15 itself or a member fixed to the base member 15. Therefore, fine adjustment is readily accomplished in the engagement between the pinion gear 20 and the ring gear 11 by rotation of the adjustment screw 31. In particular, in this configuration, the adjustment screw 31 is directly screwed into the support block 25 (adapter block 25B) at the other axial end side thereof. Accordingly, a simple structure including a small number of parts accomplishes the position adjustment for increasing the engagement depth between the gears and the position adjustment for reducing the engagement depth between the gears.

In the embodiment, one axial end side of the adjustment screw 31 of the position adjusting unit 30 is rotatably retained on a member on the base member 15 side, and the other axial end side of the adjustment screw 31 is screwed into the support block 25. This configuration is not limitative. It is also possible that one axial end side of the adjustment screw 31 is rotatably supported on the support block 25 and the other axial end side of the adjustment screw 31 is screwed into a member on the base member 15 side. However, in the case where one axial end side of the adjustment screw 31 is rotatably retained on a member on the base member 15 side, as in the embodiment, the head 31b of the adjustment screw 31 being rotated is not displaced along with the speed reducer 13 along the gear-to-gear direction Di. Accordingly, the adjusting work is facilitated.

Further, in the power transmission device 10 of the embodiment, the adjustment screw 31 (screw shaft 31a) of the position adjusting unit 30 extends along the gear-to-gear direction Di. Therefore, in actual operation of the power transmission device 10 (rotating jig 1), the adjustment screw 31 can also receive a large engagement reaction force possibly acting from the ring gear 11 side onto the pinion gear 20 side (speed reducer 13 side). Therefore, it is possible to effectively prevent fine displacement of the pinion gear 20 due to input of a large impact load (engagement reaction force), occurrence of operation noises, breakage of engaging parts, and occurrence of wear.

Further, in the power transmission device 10 of the embodiment, the distal end portion of the adjustment screw 31 (screw shaft 31a) is screwed into the adapter block 25B fitted on the outer peripheral surface of the housing case 25A of the speed reducer 13. Therefore, there is no need of forming a screw hole for receiving the distal end portion of the adjustment screw 31 in the housing case 25A of the speed reducer 13. This facilitates the processing work of the housing case 25A and increases the strength of the housing case 25A.

Further, this configuration can be readily applied to a speed reducer 13 having a different outer diameter if the adapter block 25B is replaced with another having a different inner diameter. This configuration is also applicable to a speed reducer 13 different in specifications other than outer diameter such as shaft length if the adapter block 25B is replaced with another. It is also possible that the adapter block 25B is omitted and the distal end portion of the adjustment screw 31 is directly screwed into the peripheral wall of the housing case 25A.

Further, in the power transmission device 10 of the embodiment, the fixing unit that fixes the support block 25 to the base member 15 includes: the fastening bolts 40 for fixing the support block 25 to the base member 15; and the shaft holes 42a, 42b provided in the support block 25 so as to be parallel with the axial direction of the pinion gear 20. The fastening bolts 40 can be fastened in the direction parallel with the axial direction of the pinion gear 20 (an intersection direction intersecting with the direction in which the engagement depth varies). The shaft holes 42a, 42b have such an inner diameter (size) as to allow displacement of the support block 25 in the radial direction. Therefore, when the fastening bolts 40 are loosened, the position of the support block 25 can be adjusted in the radial direction.

In particular, to adjust the position of the support block 25 in the radial direction, the fastening bolts 40 are slightly loosened, not removed completely. Thus, the support block 25 is temporarily retained to the base member 15 by the heads of the fastening bolts 40, and in this state, the position of the support block 25 can be readily adjusted. However, the fixing unit that fixes the support block 25 to the base member 15 is not limited to the above configuration, but may be configured in other ways as long as it can fix the support block 25 to the base member 15.

In the embodiment, the shaft holes 42a, 42b with a perfectly circular shape have an inner diameter sufficiently larger than the outer diameter of the shafts 40a of the fastening bolts 40, such that the gap d is maintained between the fastening bolts 40 and the shaft holes 42a, 42b to allow displacement of the support block 25 in the radial direction. However, it is also possible that the shaft holes 42a, 42b through which the fastening bolts 40 are inserted do not have a perfectly circular shape but have such an elongated shape as to maintain a gap allowing the displacement in the gear-to-gear direction Di.

In the power transmission device 10 of the embodiment, the shaft holes 42a, 42b formed in the support block 25 have a perfectly circular shape with an inner diameter sufficiently larger than the outer diameter of the shafts 40a of the fastening bolts 40. Accordingly, the processing work of the shaft holes 42a, 42b in the support block 25 is facilitated. Further, when the speed reducers 13 having the same specifications are used in the power transmission device 10 including the position adjusting unit 30 (engagement adjusting device) and a power transmission device not including the position adjusting unit 30, the power transmission device 10 including the position adjusting unit 30 should use the fastening bolts 40 with a smaller shaft diameter than the fastening bolts 40 used for fixing of the power transmission device not including the position adjusting unit 30. Therefore, with this configuration, the speed reducers having the same specifications can be used in the power transmission device 10 including the position adjusting unit 30 and the power transmission device not including the position adjusting unit.

OTHER EMBODIMENTS

In the above embodiment, the main component of the position adjusting unit 30 is the adjustment screw 31 that is rotatably retained to the member on the base member 15 side and having the distal end portion thereof fastened into the support block 25 side. However, the position adjusting unit 30 is not limited to this configuration. For example, the position adjusting unit 30 may be constituted by: an adjustment screw that can be operated to push the outer peripheral surface of the support block 25 toward one side in the gear-to-gear direction Di; and a spring member such as a disc spring disposed at the opposed position on the outer periphery of the support block 25 and imparting an elastic reaction force toward the other side in the gear-to-gear direction Di. In this case, the adjustment screw may be replaced with another operation mechanism such as a lever mechanism.

The present invention is not limited to the above-described embodiments and can be modified in a variety of designs without deviating from the spirit of the present invention. For example, in the above embodiment, the first gear is formed of the pinion gear 20, and the second gear is formed of the ring gear 11. However, the first gear and the second gear may have any shape and size as along as these gears engage with each other.

Further, in the above embodiment, the second gear (pinion gear 20) is rotatably coupled to the speed reducer 13. However, the second gear is not necessarily coupled to the speed reducer 13. For example, the second gear may be directly coupled to a power source such as the motor 12 without the speed reducer 13 interposed therebetween.

Further, application of the power transmission device 10 is not limited to the rotating jig 1. The power transmission device 10 can be applied to moving parts of other various apparatuses such as turning parts of a robot arm.

What is claimed is:

1. A power transmission device comprising:
   a first gear;
   a base member configured to rotatably support the first gear;
   a second gear configured to engage with the first gear so as to be able to transmit power;
   a support block configured to rotatably support the second gear;
   a position adjusting unit configured to adjust relative positions of the support block and the base member in a direction in which an engagement depth between the second gear and the first gear varies; and
   a fixing unit configured to fix the relative positions of the support block and the base member,
   wherein the position adjusting unit comprises a screw mechanism that includes an adjustment screw having a screw shaft extending in the direction in which the engagement depth between the second gear and the first gear varies, and
   wherein the support block includes:
      a housing case of a speed reducer, the speed reducer being configured to transmit decelerated power to the second gear; and
      an adapter block fitted on an outer peripheral surface of the housing case,
   wherein the screw mechanism is rotatably retained on the base member at one end side in the axial direction of the screw shaft, and the screw mechanism is screwed into the adapter block at an other end side in the axial direction.

2. The power transmission device of claim 1, wherein the fixing unit includes:
   a fastening member configured to be fastened in an intersection direction intersecting with the direction in which the engagement depth between the second gear and the first gear varies, the fastening member being configured to fix the support block to the base member; and
   a shaft hole provided in the support block along the intersection direction and penetrated by a shaft of the fastening member, and
   wherein the shaft hole has such an inner shape or a size as to allow displacement of the support block in the direction in which the engagement depth between the second gear and the first gear varies.

3. The power transmission device of claim 2, wherein the shaft of the fastening member has such an outer diameter as to form a gap between the shaft and the shaft hole, and the gap is formed to allow the displacement.

* * * * *